United States Patent [19]

Stella

[11] Patent Number: 4,664,492

[45] Date of Patent: May 12, 1987

[54] FILM ADVANCING APPARATUS

[75] Inventor: Joseph A. Stella, Peabody, Mass.

[73] Assignee: Polaroid Corporation, Cambridge, Mass.

[21] Appl. No.: 890,932

[22] Filed: Jul. 31, 1986

[51] Int. Cl.⁴ .......................... G03B 17/50; G03B 1/00
[52] U.S. Cl. ........................................ 354/212; 354/86
[58] Field of Search ....................... 354/83, 84, 85, 86, 354/212, 276, 277

[56] References Cited

U.S. PATENT DOCUMENTS

| | | | |
|---|---|---|---|
| 3,405,618 | 10/1968 | Land | 354/84 |
| 3,741,095 | 6/1973 | Harvey | 354/86 |
| 3,872,487 | 3/1975 | Gold | 354/86 |
| 3,886,570 | 5/1975 | Asano et al. | 354/86 |
| 3,994,006 | 11/1976 | Ichii | 354/85 |
| 4,152,057 | 5/1979 | Henning et al. | 354/86 |
| 4,152,063 | 5/1979 | Henning | 354/212 |
| 4,208,114 | 6/1980 | Ito et al. | 354/86 |
| 4,555,213 | 11/1985 | Tamura et al. | 354/276 |

Primary Examiner—A. A. Mathews
Attorney, Agent, or Firm—Alfred E. Corrigan

[57] ABSTRACT

Film advancing apparatus for moving a thin, planar, resilient film unit at least partially from a film cassette. The apparatus includes a member for applying a force to one end of the film unit while simultaneously blocking its movement through an egress in the film cassette, thus causing the film unit to assume a flexed stressed configuration. When the egress is unblocked, the resiliency of the film unit provides a force for moving an opposite end of the film unit out of the film cassette via the egress as it assumes its original planar configuration.

7 Claims, 3 Drawing Figures

FILM ADVANCING APPARATUS

BACKGROUND OF THE INVENTION

1. Field of The Invention

This invention relates to apparatus for advancing a thin, resilient, generally planar photographic film unit from a film cassette.

2. Description of The Prior Art

The present invention relates to film advancing apparatus of the type adapted to advance a thin sheet of resilient, generally planar, photographic film from a film cassette, preferably subsequent to its exposure.

Film advancing apparatus for moving a generally planar, film unit from a film cassette subsequent to its photographic exposure are generally well known in the art. One example of such an apparatus is shown in U.S. Pat. No. 4,152,063 wherein a pair of laterally spaced members are moved through an exposureopening in a film cassette into frictional engagement with a major surface of an exposed film unit so as to advance it to the exterior of the cassette and into the bite of a pair of processing rollers. Another example is shown in U.S. Pat. No. 3,741,095 wherein the film advancing apparatus includes a pair of laterally spaced members which are mounted for rotation into engagement with a trailing edge of an exposed film unit prior to moving it out of a cassette and into the bite of a pair of processing rollers. Still further, reference may be had to U.S. Pat. No. 3,405,618 wherein is shown a camera having a film advancing apparatus comprised of a friction roll for moving an exposed sheet of photographic film in the form of an image-recording sheet into superposed position with an image-receiving sheet.

One of the problems with the film advancing apparatus described above with reference to the '095 patent is that it is not readily adapted for use with thin film units, i.e., film units having a thickness of 2-4 mils at their trailing edge, because of the relatively large size of its film engaging portion. In other words, if such an apparatus were used with thin film units, there would be a good possibility that more than one film unit would be moved during each operating cycle of the apparatus.

The film advancing apparatus described in the '063 and '618 patents present a problem of providing the film unit engaging member(s) with enough force or torque to move the exposed film unit without also causing that film unit to drag the next adjacent film unit along therewith because of the frictional forces between the two film units. Should this happen, more than one film unit may be moved toward the exterior of the film cassette at a time, or the next adjacent film unit, if physically maintained in place, may be deformed by the frictional forces acting on its entire length during the movement of the exposed film unit.

SUMMARY OF THE INVENTION

The present invention relates to apparatus for moving a film unit from atop a stack of the same to the exterior of a film cassette containing the stack; and more particularly to an apparatus which initially causes the film unit to assume a flexed, stressed, condition and thereafter utilizes a portion of the stressed forces in the film unit to move its leading edge to the exterior of the film cassette as the film unit reassumes its original condition.

The film advancing apparatus is especially adapted for use with a film assemblage of the type which includes a film cassette having an exposure opening in one wall and a laterally extending egress in another wall thereof, the egress being dimensioned to permit the film units to be advanced therethrough one at a time. The assemblage further includes a stack of thin, resilient, generally planar film units, and biasing means in the form of a spring platen for urging the stack of film units toward the opening in the film cassette such that an endmost film unit in the stack has its image-recording area located in alignment wih the opening and with one of its edges (leading edge) located in position to be moved through the egress.

The film advancing apparatus includes an L-shaped member having first and second arms which extend at a right angle to each other. The first arm is pivotally supported intermediate its length such that it runs along side one side of a film cassette while the second arm extends across and parallel with a leading end wall of the film cassette. A cam follower on a free end of the first arm is resiliently biased into engagement with a cam such that rotation of the cam is effective to cause the L-shaped member to move from a first position, wherein the second arm is in blocking relation to the egress in the leading end wall of the film cassette thereby preventing a film unit from being moved out of the film cassette, and a second position wherein the second arm is in a non-blocking position. The cam is fixedly mounted on a motor driven shaft. Also fixedly mounted upon this shaft is a pair of spaced film engaging members, the ends of which are provided with any suitable means having a high coefficient of friction, e.g., butyl rubber or polyurethane foam. The film engaging members are adapted to be rotated into the opening in the film cassette and into engagement with a trailing end of a film unit, subsequent to its exposure, and apply a frictional force thereto having a component which attempts to move the film unit through the egress in the film cassette. However, at this time, the cam is still holding or maintaining the second arm of the L-shaped member in the first position wherein it prevents the film unit from being advanced out of the film cassette. Continued rotation of the driven shaft and the attached film engaging members is effective to cause an intermediate portion of the film unit to flex upwardly through the opening in the film cassette as it assumes a stressed, bowed configuration. At this point, the cam follower falls off of a high point on the cam and is resiliently urged onto a low point on the cam, thus allowing movement of the second arm out of blocking relation with the cassette's egress. Thus, with the film engaging members now about to rotate out of engagement with the trailing end of the film unit, but still in engagement therewith, and with the restraint of the second arm being suddenly removed from the leading edge of the film unit, the stored forces in the stressed film unit are released causing the unencumbered leading edge of the film unit to move quickly through the egress as the film unit returns to its original unstressed planar configuration. As the leading edge and thus the leading end of the film unit emerges from the film cassette it is directed into the bite of a pair of rotatable members which continue the advancement of the film unit from the film cassette. The film unit may then be advanced to a position whereat a processing liquid is applied to a surface thereof to initiate the formation of a visible image.

An object of the invention is to provide a film advancing apparatus which will initially stress a thin, resilient, planar film unit by causing it to assume a bowed configuration, and thereafter utilize a portion of such stress to move an end of the film unit to the exterior of a film cassette.

Another object of the invention is to provide a film advancing apparatus of the type described with means for applying a force to one end of a film unit while simultaneously blocking movement of the opposite end of the film unit from the film cassette until such time that forces built up in the film unit are sufficient to move its leading edge to the exterior of the film cassette upon the removal of such blockage.

The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
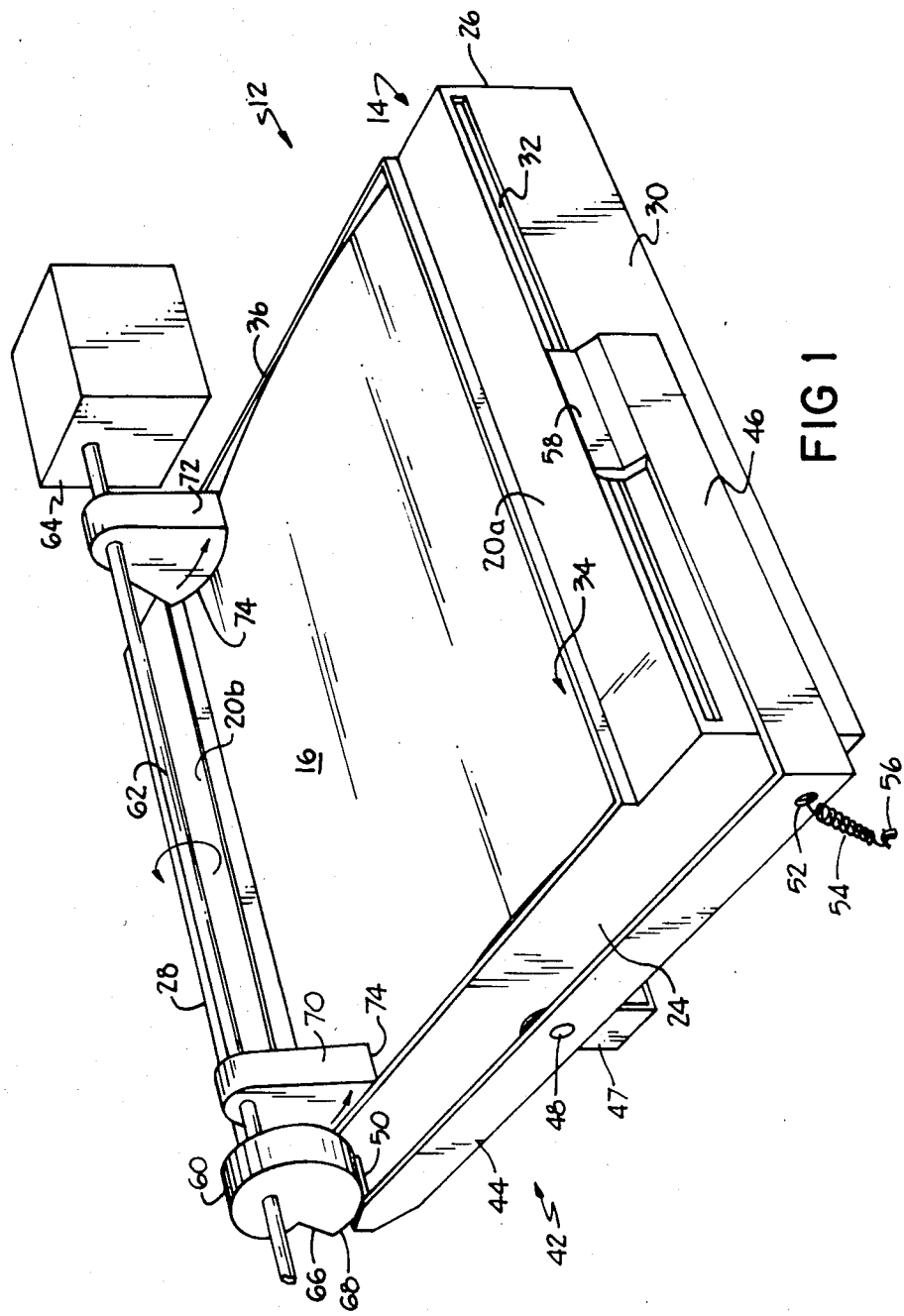
FIG. 1 is a perspective view of a preferred embodiment of a film advancing apparatus and its relation to a film assemblage.

Reference is now made to the drawings wherein is shown a film advancing apparatus 10 which is especially adapted for use with a film assemblage 12.

The film assemblage 12 includes a film cassette 14, a stack of thin (2-4 mils), resilient, planar film units 16, a spring platen 18, and a dark slide (not shown) which is adapted to prevent premature exposure of the film units 16 during loading of the film assemblage 10 into a photographic apparatus.

The film cassette 14 is molded from any suitable opaque material and includes a top wall comprised of spaced sections 20a and 20b, a bottom wall 22, a pair of laterally spaced side walls 24 and 26, a trailing end wall 28, and a leading end wall 30 having a laterally extending egress 32 therein through which the uppermost film unit 16 in the stack is adapted to be moved to the exterior of the film cassette 14. The upper wall of the film cassette 14 also includes an exposure opening 34 defined by a continuous upstanding rib 36. The aforementioned spring platen 18 is adapted to urge the stack of film units 16 upwardly toward the exposure opening 34 such that the image-recording area of the uppermost film unit 16 is located in alignment therewith and its leading edge 38 is located in alignment with the egress 32 in the leading end wall 30.

The film units 16 are preferably of the instant or self-developing type and do not include any rails, masks, traps, containers of processing liquid, or image-receiving element thereby keeping the thickness of the film units 16 to a minimum. Each of the film units 16 may consist of an opaque sheet of material, such as Mylar, which supports an image-recording layer. After the exposure of the image-recording layer the film unit 16 is advanced from the film cassette 14 to a position whereat it is juxtaposed and permanently laminated to an image-receivng element having a nonviscous processing composition previously impregnated therein, the processing composition being adapted to be imbibed by the image-recording layer so as to initiate the formation of a visible image in the image-receiving layer, as is well known in the art. For an example of such a film unit, reference may be had to U.S. Pat. No. 3,907,563 granted to E. H. Land on Sept. 23, 1975.

The film advancing apparatus 10 includes an L-shaped member 42 having first and second arms 44 and 46, respectively, extending at a right angle to each other. The first arm 44 extends alongside and generally parallel with the side wall 24 of the film cassette 14 when the latter is located in position for the sequential exposure of the film units 16, as depicted in FIG. 1. The first arm 44 is pivotally connected to a fixed upwardly extending flange 47 by a pin 48. A free end of the first arm 44 is provided with an inwardly directed cam follower 50 in the form of a pin while the opposite end of the first arm 44 has an aperture 52 therein for receiving one end of a spring 54, the other end of the spring 54 being attached to a fixed portion of a photographic apparatus at 56. The second arm 46 extends inwardly from the first arm 44 and across and generally parallel with the leading end wall 30 of the film cassette 14. The second arm 46 terminates in an offset portion 58 which is located closely adjacent and in blocking relation to the egress 32 in the film cassette 14 when the L-shaped member is located in a first operative position, as shown in FIG. 1. When so located, a film unit 16 is prevented from exiting from the film cassette 14 via the egress 32.

Figure 3:
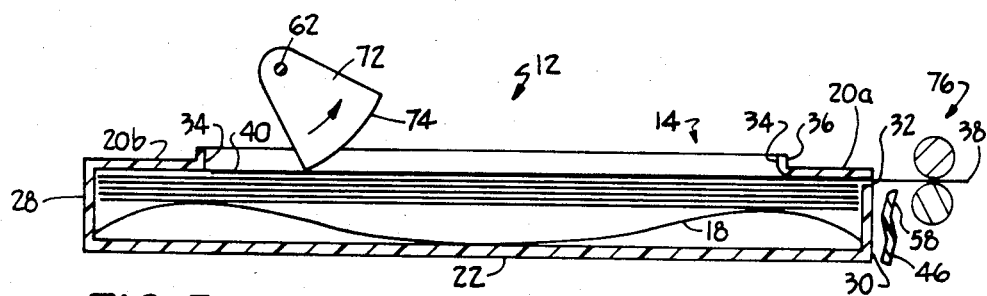
FIG. 3 is a view similar to FIG. 2 showing the topmost film unit after it has been allowed to return to its original unstressed planar condition.

The film advancing apparatus 10 further includes a cam 60 fixedly mounted on a shaft 62 which is in turn adapted to be driven by a battery operated motor 64. Alternatively, the shaft 62 may be rotated by any suitable manually operative means, such as a crank. The cam 60 includes a peripheral surface upon which the cam follower 50 rides from a minimum diameter or low point 66 to a maximum diameter or high point 68, the spring 54 functioning to maintain the cam follower 50 in engagement with the cam 60. Thus, the cam 60, the cam follower 50, the first arm 44 and the spring 54 function as a means for moving the portion 58 of the second arm 46 between the aforementioned first position wherein it blocks the egress 32, to a second inoperative position, as shown in FIG. 3 wherein the portion 58 is located out of blocking relation to the egress 32.

A pair of laterally spaced, substantially identically configured, film engaging members 70 and 72 are also fixedly secured to the shaft 62. Each of the members 70 and 72 includes a curved surface 74 having a coating of any suitable material thereon having a high coefficient of friction. As best seen in FIG. 1, the film engaging members 70 and 72 are adapted to be rotated in the direction of the arrows into and out of frictional engagement with the lateral margins of the film unit 16.

Figure 2:
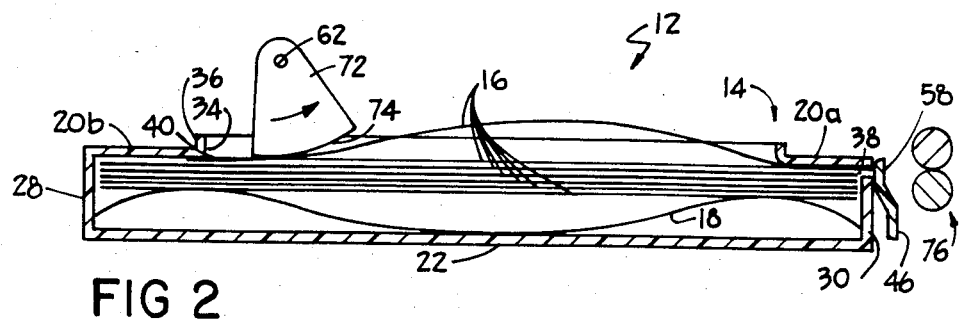
FIG. 2 is a side elevational view, on a reduced scale, of the film assemblage shown in FIG. 1 with a topmost film unit in a stack being held in a stressed, bowed configuration.

Subsequent to the photographic exposure of the uppermost film unit 16 in the film cassette 14, the motor 64 is energized so as to rotate the shaft 62 in a counter-clockwise direction through one revolution. Such rotation is effective to rotate the film engaging members 70 and 72 from a position (not shown) outside of a zone in which image bearing light rays travel during exposure to a position wherein they extend into the opening 34 in the film cassette 14 and engage the lateral margins of the exposed film unit 16, thereby applying thereto frictional forces having components which attempt to drive the exposed film unit 16 to the exterior of the film cassette 14 via the egress 32 and into the bite of a pair of driven rollers 76. However, the leading edge 38, vis-a-vis, its leading end, can only move through a small distance equal to approximately the thickness of the leading end wall 30 of the film cassette 14 before it engages the offset portion 58 of the second arm 46. Continued rotation of the shaft 62 now causes the film engaging members 70 and 72 to apply additional frictional forces to the major surface of the exposed film unit thereby causing it to flex upwardly and assume a bowed configuration, as shown in FIGS. 1 and 2. During this time, the cam 60 has rotated to a position whereat the cam follower 50 is at the high point 68 of the cam's peripheral surface. Thus, the egress 32 is still blocked by the portion 58 and the bowed film unit 16 is in a stressed condition. During the next few degress of rotation of the shaft 62, the high point 68 on the cam 60 moves out of engagement with the cam follower 50, thus enabling the spring 54 to rapidly rotate the L-shaped member 42 in a clockwise direction into its second inoperative position wherein the portion 58 is out of blocking relation with the egress, as shown in FIG. 3. With the blocking restraint removed from the exposed film unit's leading edge 38, the stresses built up in the resilient film unit 16 during its bowing are released and a portion thereof used to rapidly advance the leading end of the film unit 16 through the egress 32 and into the bite of the driven rollers 76. As the film unit 16 moves into its original planar configuration, the surfaces 74 of the film engaging members 70 and 72 rotate out of engagement with the trailing end 40 of the exposed film unit and into their original position as the motor 64 is deenergized.

Since certain changes may be made in the above invention without departing from the scope thereof, it is intended that all matter contained in the above description or shown in the accompanying drawings shall be interpreted as illustrative and not in a limiting sense. For example, while the invention has been described with reference to a film unit of the instant type which is photographically exposed while in a film cassette it should be recognized that the invention equally applies to other types of film units and that the exposure of the film unit, in all cases, may take place prior to or after movement from the film cassette.

What is claimed is:

1. Film advancing apparatus for use with a film assemblage of the type including a film cassette having therein a stack of thin, resilient, generally planar configured photographic film units with a major surface of one of the film units located in alignment with an opening in one wall of the film cassette and with a leading edge of the one film unit located in position to be moved through an egress in another wall of the film cassette, said film advancing apparatus comprising:

blocking means mounted for movement between a first opertive position wherein it is located in position to prevent the movement of the leading edge of a film unit through the egress in the film cassette, and a second inoperative position in which it allows such movement of the film unit's leading edge;

means for engaging the film unit at a location opposite the leading edge thereof and applying a force thereto in a direction which initially urges the leading edge of the film unit into the egress and into engagement with said blocking means and thereafter causes at least a portion of the major surface of the film unit to be flexed partially through the opening in the film cassette and out of engagement with an adjacent film unit;

means for moving said blocking means between said first and second positions, said blocking means being moved out of said first position during the time that the film unit is in the flexed condition thereby enabling the film unit's resiliency to provide a force for moving the leading edge of the film unit completely through the egress in the film cassette as the film unit returns toward its original configuration; and means for driving said engaging means and said moving means.

2. Film advancing apparatus as defined in claim 1 wherein said engaging means comprises at least one member mounted for movement into frictional engagement with the major surface of the film unit.

3. Film advancing apparatus as defined in claim 1 wherein said engaging means comprises at least two members mounted for movement into frictional engagement with lateral sides of the film unit.

4. Film advancing apparatus as defined in claim 1 wherein said moving means comprises a rotatably mounted cam and a lever pivotally supported between its opposite ends with one end connected to said blocking means and an opposite end biased into engagement with said cam.

5. Film advancing apparatus as defined in claim 4 wherein said engaging means and said moving means are constructed such that said moving means moves said blocking means into said second position immediately prior to said engaging means moving out of engagement with the film unit.

6. Film advancing apparatus as defined in claim 5 wherein said moving means includes a shaft mounted for rotation about its longitudinal axis, and said engaging means and said cam are mounted on said shaft.

7. Film advancing means as defined in claim 6 further including a pair of rollers having adjacent surfaces defining a bite into which the leading edge of the film unit is adapted to be moved, said rollers being adapted to be driven in a direction to continue the movement of the film unit from the film cassette.

* * * * *